US006622545B2

(12) United States Patent
Weldon et al.

(10) Patent No.: US 6,622,545 B2

(45) Date of Patent: Sep. 23, 2003

(54) LEAK DETECTION SYSTEM AND METHOD HAVING SELF-COMPENSATION FOR CHANGES IN PRESSURIZING PUMP EFFICIENCY

(75) Inventors: Craig Andrew Weldon, Chatham (CA); Raymond Rasokas, Thamesville (CA)

(73) Assignee: Siemens VDO Automotive Inc., Chatham (CA)

( * ) Notice: Subject to any disclaimer, the term of this patent is extended or adjusted under 35 U.S.C. 154(b) by 113 days.

(21) Appl. No.: 09/896,247

(22) Filed: Jun. 29, 2001

(65) Prior Publication Data

US 2003/0000290 A1 Jan. 2, 2003

(51) Int. Cl.[7] ........................ G01M 15/00; G01M 3/20; F02M 37/04

(52) U.S. Cl. ........................... 73/49.7; 73/118.1; 73/40; 123/520

(58) Field of Search ......................... 73/49.7, 40, 118.1, 73/1.16; 123/520

(56) References Cited

U.S. PATENT DOCUMENTS

| | | | | |
|---|---|---|---|---|
| 5,606,121 A | * | 2/1997 | Blomquist et al. | 73/118.1 |
| 5,817,925 A | * | 10/1998 | Cook et al. | 73/40 |
| 5,967,124 A | | 10/1999 | Cook et al. | 123/520 |
| 5,974,861 A | | 11/1999 | Cook et al. | 73/40 |
| 5,987,968 A | * | 11/1999 | Cook et al. | 73/49.7 |
| 6,009,746 A | | 1/2000 | Cook et al. | 73/49.7 |
| 6,016,691 A | | 1/2000 | Cook et al. | 73/49.7 |
| 6,016,793 A | | 1/2000 | Cook et al. | 123/520 |
| 6,044,314 A | * | 3/2000 | Cook et al. | 701/31 |
| 6,192,743 B1 | | 2/2001 | Perry | 73/40 |
| 6,253,598 B1 | * | 7/2001 | Weldon et al. | 73/40 |
| 6,334,355 B1 | * | 1/2002 | Grieve et al. | 73/49.7 |
| 6,357,288 B1 | * | 3/2002 | Shigihama et al. | 73/118.1 |
| 6,389,882 B1 | * | 5/2002 | Ohkuma | 73/49.7 |

* cited by examiner

*Primary Examiner*—Hezron Williams
*Assistant Examiner*—David Wiggins

(57) ABSTRACT

A leak detection system for a fuel system of an automotive vehicle has a diaphragm pump that is repeatedly stroked to pressurize vapor containment space of the fuel system during a leak detection test. A restriction is disposed between the pump and the space being pressurized to cause a real time pressure trace of pressure between the pump and the restriction to comprise a succession of pulses having peaks and valleys. Data from the first pump burst of the trace is used to adjust the number of times the pump is stroked during subsequent bursts to maintain substantially constant mass airflow into the space during each burst, thereby compensating for change in pump efficiency.

8 Claims, 3 Drawing Sheets

LEAK DETECTION SYSTEM AND METHOD HAVING SELF-COMPENSATION FOR CHANGES IN PRESSURIZING PUMP EFFICIENCY

FIELD OF THE INVENTION

This invention relates generally to a system and method for detecting gas leakage from an enclosed space, such as fuel vapor leakage from an evaporative emission space of an automotive vehicle fuel system, especially to a system and method where a diaphragm pump positively pressurizes the space during a leak detection test.

BACKGROUND OF THE INVENTION

A known on-board evaporative emission control system for an automotive vehicle comprises a vapor collection canister that collects volatile fuel vapors generated in the headspace of a fuel tank by the volatilization of liquid fuel in the tank and a purge valve for periodically purging fuel vapors to an intake manifold of the engine. A known type of purge valve, sometimes called a canister purge solenoid (or CPS) valve, is under the control of a microprocessor-based engine management system, sometimes referred to by various names, such as an engine management computer or an engine electronic control unit.

During conditions conducive to purging, the purge valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an onboard diagnostic capability for determining if a leak is present in the evaporative emission space.

One known type of vapor leak detection system for determining integrity of an evaporative emission space performs a leak detection test by positively pressurizing the evaporative emission space using a positive displacement diaphragm pump. The diaphragm is reciprocated to create test pressure. Commonly owned U.S. Pat. No. 6,192,743, issued Feb. 27, 2001, discloses a module comprising such a pump.

It has been discovered that the output efficiency of such a pump may change due to factors such as temperature, age, friction, etc. As efficiency decreases, the length of time that the pump requires to create a specified pressure within a defined volume increases. Because a window of time that is available for a test may be limited, increases in the time required to create suitable test pressure for allowing a test to proceed may prevent the test from being completed within that window.

SUMMARY OF THE INVENTION

In view of this discovery, it would be desirable to provide measures for avoiding significant test time increases as pumping efficiency decreases.

The present invention is directed to a solution for avoiding such increases.

One general aspect of the invention relates to a leak detection system for a fuel system of an automotive vehicle that contains volatile fuel for operating the vehicle. The leak detection system comprises a diaphragm pump that is repeatedly stroked to pressurize vapor containment space of the fuel system during a leak detection test. A restriction is disposed between the pump and the space being pressurized to cause a graph plot of pressure at the pump outlet ahead of the restriction versus time to comprises a succession of peaks and valleys.

A further aspect includes a processor for determining the difference between the peaks and valleys and for adjusting the frequency at which the pump is stroked to maintain a substantially constant mass airflow into the space as efficiency of the pump changes.

Other aspects relate to leak detection methods involving the restriction and the processor.

It is believed that the inventive principles extend to a general method for self-compensating a volumetric pump for decreasing volumetric efficiency so as to maintain a desired mass gas flow into a closed test space being tested for leakage. The pump is operated to pressurize the space during a leak detection test. A restriction disposed between the pump and the space being pressurized to causes a real time pressure trace of pressure between the pump and the restriction to comprise a succession of pulses having peaks and valleys. Data from the pressure trace is used to adjust pump operation to cause the pump to maintain the desired mass gas flow as pump efficiency changes.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
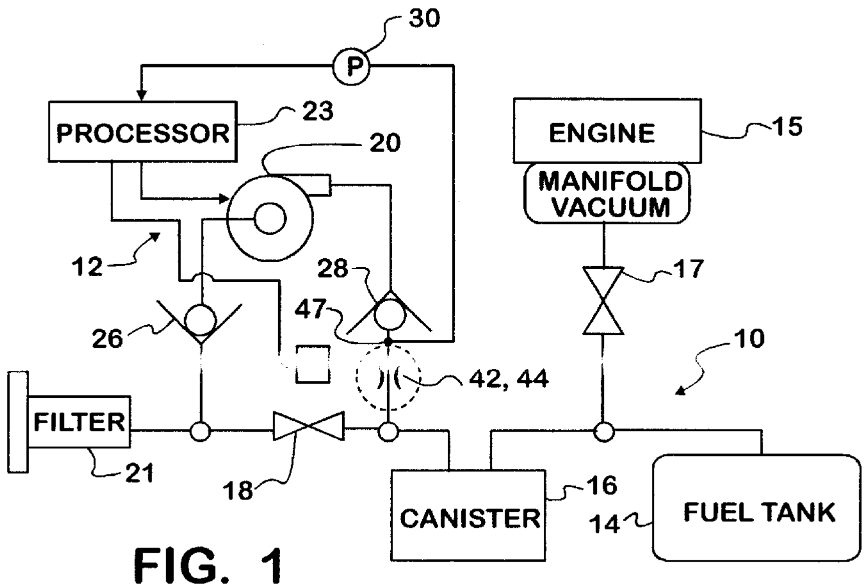
FIG. 1 is a general schematic diagram of an exemplary automotive vehicle evaporative emission control system including a leak detection system embodying principles of the invention.

FIG. 1 shows an example of a portion of an automotive vehicle fuel system 10, including a leak detection system 12. A fuel tank 14 holds a supply of volatile liquid fuel for an engine 15 that powers the vehicle. Fuel vapors that are generated within headspace of tank 14 are collected in a vapor collection canister 16 that forms a portion of an evaporative emission control system.

At times conducive to canister purging, the collected vapors are purged from canister 16 to engine 15 through a purge valve 17. For purging, purge valve 17 and a canister vent valve 18 are both open. Vent valve 18 vents canister 16 to atmosphere, allowing engine manifold vacuum to draw air into and through canister 16 where collected vapors entrain with the air flowing through the canister and are carried into the engine intake system, and ultimately into engine 15 where they are combusted.

From time to time, leak detection system 12 conducts a leak detection test for ascertaining the integrity of the evaporative emission control system against leakage. Purge valve 17 and vent valve 18 are operated closed to close off the space of the evaporative emission system that contains the fuel vapors. That space is then positively pressurized to determine if any leakage is present. A diaphragm pump 20, as described above, is used to pressurize the space being tested. Although the space has been closed off, the pump is still able to draw air from atmosphere through a filter 21 to develop suitable positive pressure in the space for conducting the test.

Details of such a pump and an associated module, and leak test procedures, are well disclosed in commonly owned U.S. Pat. Nos. 5,967,124; 5,974,861; 6,009,746; 6,016,691; 6,016,793; and 6,192,743 where vent valve 18 is integrated with the module and pump 20 is housed with the module enclosure. The module has ports for establishing proper communication of the pump and vent valve with the emission control system and atmosphere.

Figure 4:
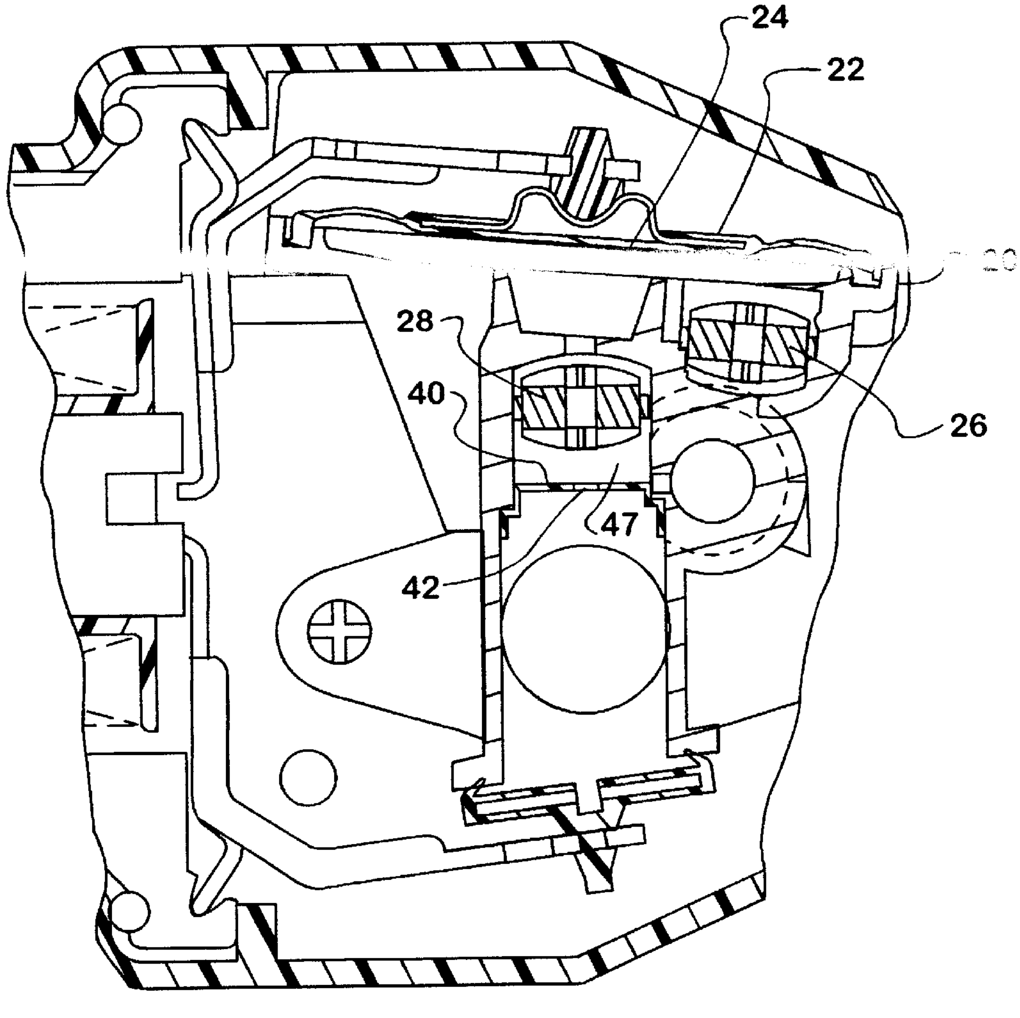
FIG. 4 is fragmentary plan view of a portion of a leak detection module showing a first exemplary embodiment of the invention.
Figure 5:
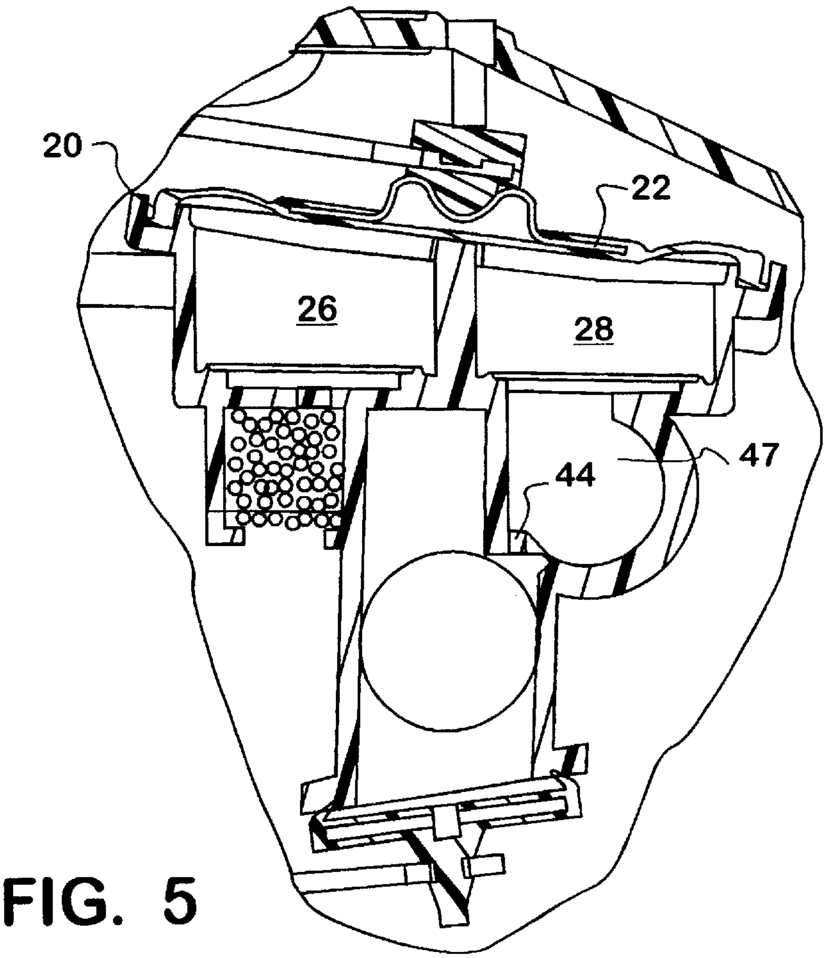
FIG. 5 is a view like FIG. 4 showing a second exemplary embodiment.

As shown by FIGS. 4 and 5, pump 20 comprises a movable wall 22 that has an outer perimeter margin held sealed to the pump housing so as to create a variable volume pumping chamber 24 within the pump interior. When the pump is stroked to displace movable wall 22 in a direction that increases the volume of pumping chamber 24, atmospheric air can pass through a first one-way valve 26 to create a charge of air in pumping chamber 24 while a second one-way valve 28 between the outlet of the pump and the space being tested prevents the pump from sucking air out of that space. When pump 20 is stroked to displace movable wall 22 in an opposite direction that decreases the volume of pumping chamber 24, the charge of air in the pumping chamber is forced through the second one-way valve 28 into the space being tested, while the first one-way valve 26 prevents the charge from being forced back into the atmosphere.

Pump is repeatedly stroked back and forth in this manner until pressure suitable for performing the leak detection test has been created in the space under test.

The sensing of pressure in the space under test is performed by a pressure sensor 30 that is integrated with the leak detection module. The sensing port of sensor 30 is communicated to sense pressure immediately after valve 28.

By providing a restriction between valve 28 and the space being tested, a characteristic that is useful in ascertaining the efficiency of the pump may be imparted to a real time pressure trace of sensed pressure. The restriction may comprise a disc 40 containing an orifice 42, as in FIG. 4, or an orifice 44 that is integrally formed in an internal wall of the module, as in FIG. 5. The volume between valve 28 and the restriction forms a chamber 47. The characteristic imparted to the real time pressure trace is a succession of pulses, sometimes referred to for convenience as a heartbeat, and that characteristic can be seen in the two traces of FIG. 2.

Figure 2:
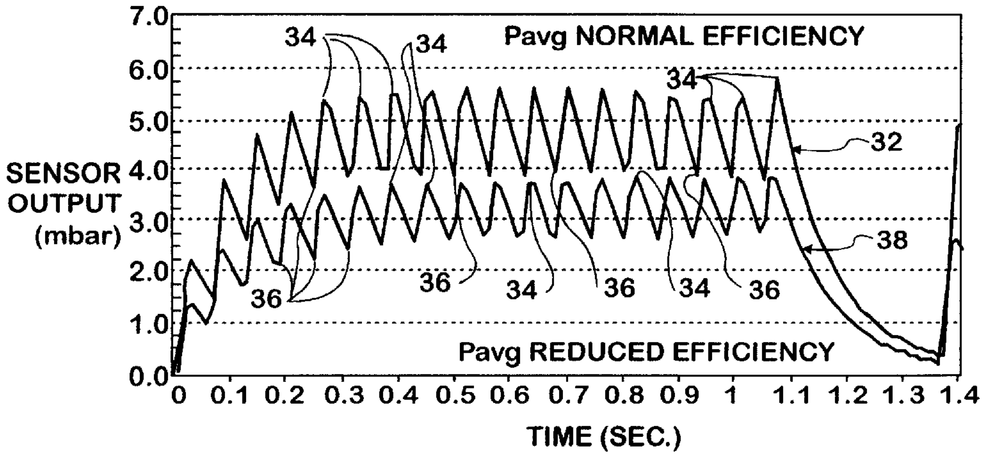
FIG. 2 is a diagram of two real time pressure traces useful in explaining principles of the invention.

When pump 20 is first operated, pressure in the space being tested is at, or at least near, atmospheric pressure, and a representative pressure trace would appear like trace 32 in FIG. 2. Trace 32 shows one pump burst that comprises a succession of pulses (heartbeats) consisting of peaks 34 and valleys 36. Each pulse corresponds to a cycle of the pump where wall 22 is stroked forward to force air out of pumping chamber 24 and then retracted backward. The rising portion of a pulse toward a peak 34 occurs as a charge of air in pumping chamber 24 is being forced out of the pump to build pressure in chamber 47. The falling portion of a pulse occurs as movable wall 24 is being retracted. As the pump is repeatedly cycled, pressure will gradually build to a residual pressure that remains when pump cycling ceases.

When pump 20 is operating at less than normal efficiency, a representative real time pressure trace would appear like trace 38 in FIG. 2. Trace 38 comprises a succession of peaks 34 and valleys 36 corresponding to stroking of the pump, but the pressure difference between each peak and the adjacent valley is noticeably less than in a pump of normal efficiency. The pressure will gradually build, but the residual pressure will be noticeably less than that of the normal pump.

Figure 3:
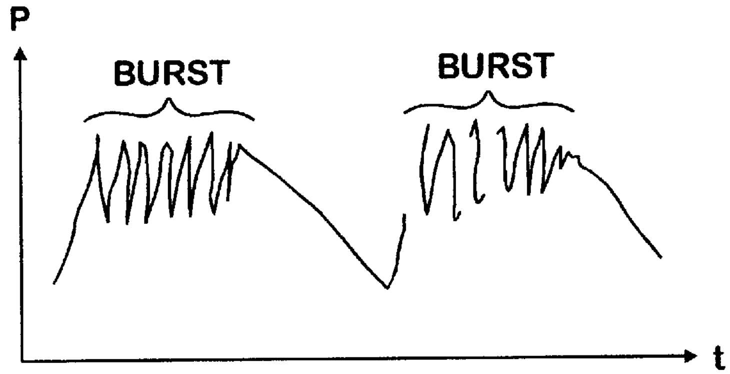
FIG. 3 is another real time pressure trace.

The pressure difference between the peaks and valleys is a measure indicative of the pump efficiency. The residual pressure is also a measure of pump efficiency. Therefore the difference between the peaks and valleys of trace 32 may be compared against the difference between the peaks and valleys of trace 38. The result of the comparison is a measured of the extent to which the pump efficiency has decreased from normal efficiency. The difference between the residual pressures may also be taken to measure loss of efficiency. The result of one or both of those comparisons is used to adjust the number of times that the pump is stroked during a pump burst. As pump efficiency decreases, the number of pump strokes forming a pump burst is increased to maintain a substantially constant mass airflow into the test space during a pressurizing burst. The computations are performed by an on-board processor, such as processor 23 in FIG. 1, thereby making the pump self-compensating so that it will create the desired mass airflow. As shown by FIG. 3, pulse bursts form only portions of the total test time, and so increasing the number of pump strokes in a burst causes only a small increase in overall test time. The processor has been programmed with stored data defining normal pump efficiency, and when calculating efficiency at the beginning of a test compares the actual heartbeat data with the programmed data to determine if additional strokes, and how many of them, need to be added to subsequent pulse bursts to cause the desired mass airflow.

It is preferable that the calculation of pump efficiency be made at the beginning of pump operation, i.e. at the end of the first pump burst while pressure in the space being tested is at or near atmospheric pressure. Once pressure begins to increase significantly above atmospheric, the accuracy of the efficiency calculation begins to decrease.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. In a leak detection system for a fuel system of an automotive vehicle that contains volatile fuel for operating the vehicle, a leak detection module comprising:

an enclosure containing a diaphragm pump that is repeatedly stroked to force air through an outlet of the enclosure into a pressurized vapor containment space of the fuel system during a leak detection test;

a restriction that is disposed within the enclosure between the pump and the outlet to define within the enclosure a pressurized chamber where a real time pressure trace of pressure, as the pump is repeatedly stroked, comprises a succession of pulses having peaks and valleys; and a pressure sensor that is ported to the chamber to provide such a pressure trace.

2. A leak detection system for a fuel system of an automotive vehicle that contains volatile fuel for operating the vehicle, the leak detection system comprising:

a diaphragm pump that is repeatedly stroked to pressurize a vapor containment space of the fuel system during a leak detection test;

a restriction that is disposed between the pump and the space being pressurized to cause a real time pressure trace of pressure between the pump and the restriction to comprise a succession of pulses having peaks and valleys; and a processor for determining the difference between the peaks and valleys and for adjusting the number of times that the pump is subsequently stroked to maintain a substantially constant mass airflow into the space as efficiency of the pump changes.

3. A leak detection system for a fuel system of an automotive vehicle that contains volatile fuel for operating the vehicle, the leak detection system comprising:

a diaphragm pump that is repeatedly stroked to pressurize vapor containment space of the fuel system during a leak detection test;

a restriction that is disposed between the pump and the space being pressurized to cause a real time pressure trace of pressure between the pump and the restriction to comprise a succession of pulses having peaks and valleys; and a processor for determining residual pressure when pump stroking ceases and for adjusting the number of times that the pump is subsequently stroked to maintain a substantially constant mass airflow into the space as efficiency of the pump changes.

4. In a leak detection system for a fuel system of an automotive vehicle that contains volatile fuel for operating the vehicle, a leak detection method comprising:

repeatedly stroking a diaphragm pump to pressurize a vapor containment space of the fuel system during a pressurizing phase of a leak detection test;

disposing a restriction between the pump and the space being pressurized to create a chamber where, as the pump is repeatedly stroked, causes a real time pressure trace of pressure to comprise a succession of pulses having peaks and valleys; and sensing pressure in the chamber as the pump is stroked and processing data, including the sensed pressure, to develop data related to pump operating efficiency.

5. In a leak detection system for a fuel system of an automotive vehicle that contains volatile fuel for operating the vehicle, a leak detection method comprising:

repeatedly stroking a diaphragm pump to pressurize a vapor containment space of the fuel system during a leak detection test; and disposing a restriction between the pump and the space being pressurized to cause a real time pressure trace of pressure between the pump and the restriction to comprise a succession of pulses having peaks and valleys; and determining the difference between the peaks and valleys and adjusting the number of times that the pump is subsequently stroked to maintain a substantially constant mass airflow into the space as efficiency of the pump changes.

6. In a leak detection system for a fuel system of an automotive vehicle that contains volatile fuel for operating the vehicle, a leak detection method comprising:

repeatedly stroking a diaphragm pump to pressurize a vapor containment space of the fuel system during a leak detection test; and disposing a restriction between the pump and the space being pressurized to cause a real time pressure trace of pressure between the pump and the restriction to comprise a succession of pulses having peaks and valleys; and determining residual pressure when pump stroking ceases and adjusting the number of times that the pump is subsequently stroked to maintain a substantially consultant mass airflow into the space as efficiency of the pump changes.

7. A method for self-compensating a volumetric pump for decreasing volumetric efficiency so as to maintain a desired mass gas flow into a closed test space being tested for leakage, the method comprising:

operating the pump to pressurize the space during a leak detection test;

disposing a restriction between the pump and the space being pressurized to cause a real time pressure trace of pressure between the pump and the restriction to comprise a succession of pulses having peaks and valleys; and utilizing data from the pressure trace to adjust pump operation to cause the pump to maintain the desired mass gas flow as pump efficiency changes.

8. A leak detection method as set forth in claim 4 including:

changing the number of times that the pump is stroked during the pressurizing phase when the processing of data discloses a change in pump operating efficiency.

* * * * *